(12) United States Patent
Li et al.

(10) Patent No.: US 11,680,823 B2
(45) Date of Patent: Jun. 20, 2023

(54) METHOD AND SYSTEM FOR MOBILE SENSOR CALIBRATION

(71) Applicant: InvenSense, Inc., San Jose, CA (US)

(72) Inventors: Zhongyang Li, Noyarey (FR); Joe Youssef, Noyarey (FR); Abbas Ataya, San Jose, CA (US); Sinan Karahan, Menlo Park, CA (US); Sankalp Dayal, Fremont, CA (US)

(73) Assignee: IvenSense, Inc., San Jose, CA (US)

( * ) Notice: Subject to any disclaimer, the term of this patent is extended or adjusted under 35 U.S.C. 154(b) by 410 days.

(21) Appl. No.: 16/944,493

(22) Filed: Jul. 31, 2020

(65) Prior Publication Data

US 2021/0033421 A1    Feb. 4, 2021

Related U.S. Application Data

(60) Provisional application No. 62/881,939, filed on Aug. 1, 2019.

(51) Int. Cl.
| | |
|---|---|
| *G01C 25/00* | (2006.01) |
| *G01C 21/20* | (2006.01) |
| *G06N 20/00* | (2019.01) |
| *G06N 5/04* | (2023.01) |
| *G05D 1/02* | (2020.01) |

(52) U.S. Cl.
CPC ............ *G01C 25/00* (2013.01); *G01C 21/20* (2013.01); *G05D 1/0212* (2013.01); *G06N 5/04* (2013.01); *G06N 20/00* (2019.01); *G05D 2201/0203* (2013.01)

(58) Field of Classification Search
CPC ...... G01C 23/00; G01C 21/20; G05D 1/0212; G05D 2201/0203; G06N 5/04
See application file for complete search history.

(56) References Cited

U.S. PATENT DOCUMENTS

| | | | |
|---|---|---|---|
| 10,852,165 B1* | 12/2020 | Davis | G01C 21/20 |
| 2012/0203488 A1* | 8/2012 | Dusha | G01C 21/183 |
| | | | 702/104 |
| 2018/0231385 A1* | 8/2018 | Fourie | G01C 21/188 |
| 2018/0313864 A1* | 11/2018 | Oshio | G01P 1/006 |
| 2022/0125270 A1* | 4/2022 | Cao | A47L 9/2836 |

* cited by examiner

*Primary Examiner* — Peter D Nolan
*Assistant Examiner* — Mikko Okechukwu Obioha

(57) ABSTRACT

A mobile robotic device has a motion sensor assembly configured to provide data for deriving a navigation solution for the mobile robotic device. The mobile robotic device temperature is determined for at least two different epochs so that an accumulated heading error of the navigation solution can be estimated based on the determined temperature at the at least two different epochs. A calibration procedure is then performed for at least one sensor of the motion sensor assembly when the estimated accumulated heading error is outside a desired range.

22 Claims, 13 Drawing Sheets

METHOD AND SYSTEM FOR MOBILE SENSOR CALIBRATION

CROSS-REFERENCE TO RELATED APPLICATIONS

This application claims priority to U.S. Provisional Patent Application No. 62/881,939, filed Aug. 1, 2019, the content of which is incorporated by reference in its entirety.

FIELD OF THE PRESENT DISCLOSURE

This disclosure generally relates to sensors that require periodic calibration and more specifically to such sensors incorporated with navigable devices, such as robotic or other autonomous vehicles.

BACKGROUND

The development of microelectromechanical systems (MEMS) has enabled the incorporation of a wide variety of sensors in a variety of applications. Notably, information from motion sensors such as gyroscopes that measure angular velocity and accelerometers that measure specific forces along one or more orthogonal axes may be used to determine the orientation, change in relative orientation and/or translational displacement of a device incorporating the sensors for use to determine positional or navigational information for the device or for other suitable purposes. Common examples include vehicles and other devices that navigate with some degree of autonomy or reliance on sensor information, such as robotic vacuums and other cleaning or maintenance devices, autonomous moving robots or vehicles, drones, surveyors, farm equipment and other heavy machinery and other similar devices. More generally, usage of sensor information is applicable to a variety of navigation, stabilization and orientation measurement applications in industrial systems including precision agriculture equipment, construction machinery, geospatial survey equipment, manned and unmanned aerial vehicles and robots. Accordingly, robots and other devices having a degree of autonomy may be used in a variety of industries, such as residential, industrial and commercial maintenance. One notable example given above is a robotic vacuum that navigates through a given environment to collect dust, dirt and debris. These concepts have been extended to other types of cleaning devices and the techniques of this disclosure will be understood to apply to any manufacturing, medical, safety, military, exploration, and/or other industries employing devices having similar functionality. Such devices required varying degrees of human control, but all rely to some degree on information from sensors to help govern their operation.

Due to the nature of electronics and mechanics, sensors in general and MEMS sensors in particular typically require initial and periodic calibration to correct bias (offset) and sensitivity errors, among others. These errors may drift and/or change due to temperature, humidity, assembly stress and other changes in peripheral conditions. For example, inaccurate bias causes problems in sensor fusion, attitude (pitch, roll, and yaw) estimation, heading reference and other parameters that are dependent on the precision of the sensors' outputs. Errors in the sensor output or sensor fusion output may lead to errors in the position and/or navigation estimation. Specifically, if it is required to integrate the raw data, for instance, from acceleration to velocity or from angular rate to angle, the bias drift problem is significantly magnified.

In light of these characteristics, it may be desirable to perform a sensor calibration operation to characterize the bias or sensitivity error, enabling a correction of the sensor data. A sensor calibration operation may employ mathematical calculations to deduce various motion states and the position or orientation of a physical system. A sensor bias may be produced by the calibration operation, which may then be applied to the raw sensor data and calibrate the sensor. As previously noted, the calibration operation may need to be performed at various times, such as at the beginning of operation and then subsequently to compensate for changes in sensor function during operation. However, successful calibration may also depend on the existence of specific conditions, such as lack of motion. Consequently, achieving the desired conditions for calibration, may involve interrupting the operation of the device. Since this represents a delay, there exists a need for systems and methods that reduce disruptions in device operation while also performing sufficient opportunities for calibration to improve sensor performance. It would also be desirable to identify conditions affecting the device that may interfere with proper calibration and postpone the calibration as warranted. As will be described in the following materials, the techniques of this disclosure these and other benefits.

SUMMARY

As will be described in detail below, this disclosure includes a method for controlling a mobile robotic device. The method includes providing a mobile robotic device having a motion sensor assembly configured to provide data for deriving a navigation solution for the mobile robotic device. The mobile robotic device temperature is determined for at least two different epochs so that an accumulated heading error of the navigation solution can be estimated based on the determined temperature at the at least two different epochs. A calibration procedure is then performed for at least one sensor of the motion sensor assembly when the estimated accumulated heading error is outside a desired range.

Further, this disclosure includes a mobile robotic device having a motion sensor assembly configured to provide data for deriving navigation solutions for the mobile robotic device and a controller having at least one processor configured to estimate an accumulated heading error as a function of temperature and perform a calibration procedure for at least one sensor of the motion sensor assembly when the estimated accumulated heading error is outside a desired range.

DETAILED DESCRIPTION

Figure 1:
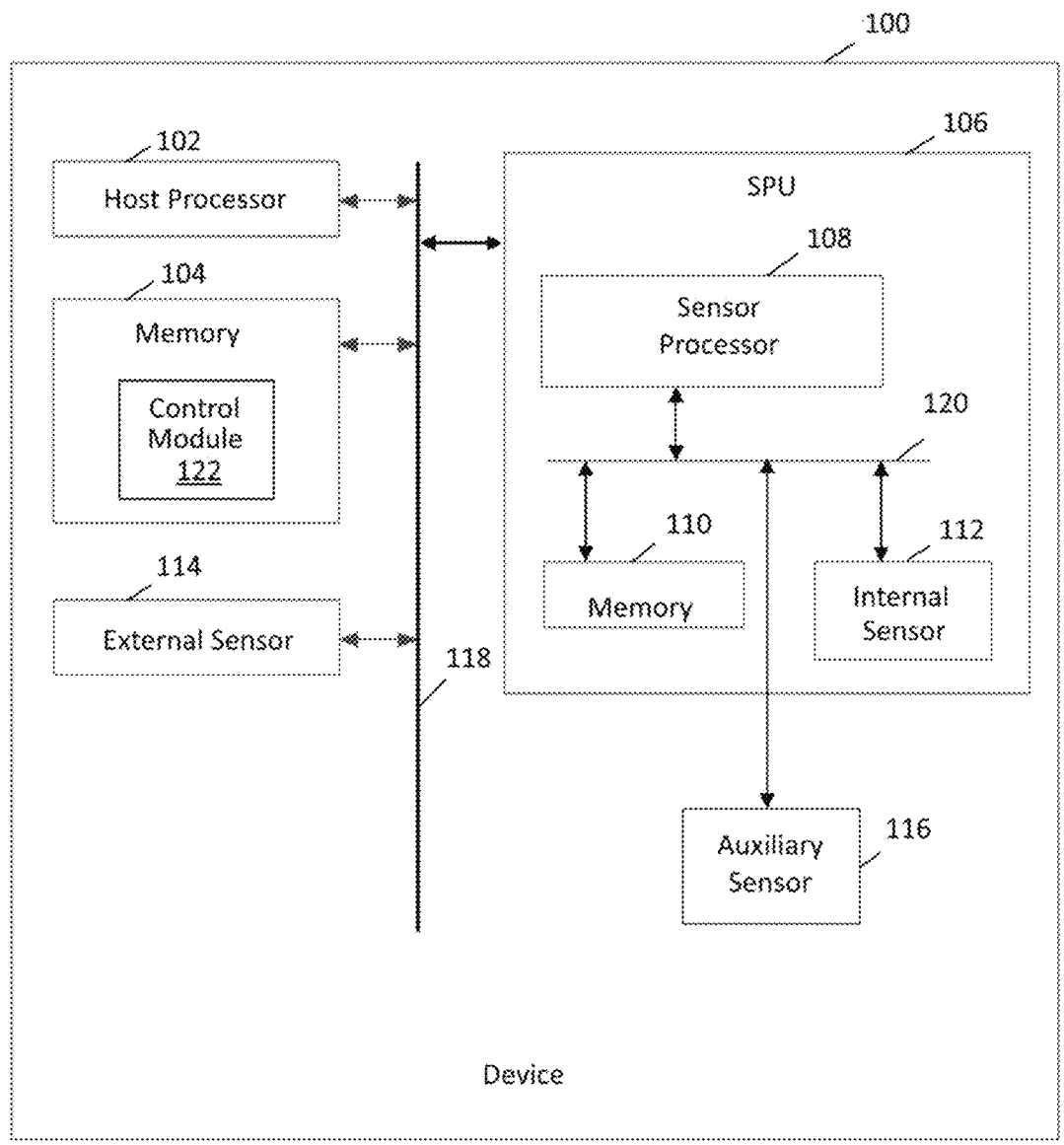
FIG. 1 is schematic diagram of device having a sensor assembly having a plurality of same type sensors according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Motion tracking systems, employed in an inertial measurement system or comprising the inertial measurement system, use motion sensors. Motion sensors are generally a gyroscope, an accelerometer, and a magnetometer sensor. The heading data, or the yaw orientation angle in the world coordinate system, is one of the key outputs from the motion tracking system in applications such as vehicle navigation or handset compass. The heading output is calculated from several motion sensors in the motion tracking system, the motion sensors being as follows: 3-axis gyroscope sensor, 3-axis accelerometer, and 3-axis magnetometer. Each sensor has 3-axis (x, y, z) measurement outputs, which are orthogonal to each other. The 3-axis measurement elements (yaw, roll and pitch) are aligned among the three sensors. As noted above, the techniques of this disclosure relate to performing sensor calibration at opportune times while reducing disruptions in operation of the device having the sensors being calibrated.

As noted above, one category of devices that may benefit from these coordinated calibration techniques are robotic or other vehicles having some degree of autonomy that rely on motion sensors for navigation and other purposes. To help provide context, relevant details regarding one exemplary embodiment of device 100 including features of this disclosure are depicted as high level schematic blocks in FIG. 1. However, the techniques of this disclosure can also be extended to any device that benefits from these calibration strategies.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and internal sensor arrangement 112. Depending on the embodiment, multiple SPUs could also be used for example. Memory 110 may store algorithms, routines or other instructions for processing data output by internal sensor arrangement 112 and/or other sensors as described below using logic or controllers of sensor processor 108, as well as storing raw data and/or motion data output by internal sensor configuration 112 or other sensors. Memory 110 may also be used for any of the functions associated with memory 104. Internal sensor arrangement 112 may be one or more sensors, such as for measuring motion, position, and/or orientation of device 100 in space, such as an accelerometer, a gyroscope, a magnetometer, a pressure sensor or others. For example, SPU 106 measures one or more axes of rotation and/or one or more axes of acceleration of the device. It should be appreciated that this exemplary embodiment is discussed with an emphasis on motion sensors, but the techniques of this disclosure can be applied to any type of sensor, including those that measure environmental phenomena or conditions other than movement of the sensor assembly.

In one embodiment, internal sensor arrangement 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. Sensors of the same type measure equivalent aspects of motion or environmental phenomena, with the same sensitive axes or the same combination of sensitive axes. In one aspect, multiple three-axis gyroscopes and/or multiple three-axis accelerometers may be employed, such that a sensor fusion operation performed by sensor processor 108, or other processing resources of device 100, combines data from the active sensors of internal sensor arrangement 112 to provide a six axis determination of motion or six degrees of freedom (6DOF). Equally, the techniques may be applied in more granularly by providing a plurality of same type single-axis sensors for different numbers of axes as desired. As desired, internal sensor arrangement 112 may be implemented using Micro Electro Mechanical System (MEMS) to be integrated with SPU 106 in a single package. Exemplary details regarding suitable configurations of host processor 102 and SPU 106 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPU 106 in device 100 are available from TDK InvenSense, Inc. of San Jose, Calif.

Alternatively, or in addition, device 100 may implement a sensor assembly in the form of external sensor arrangement 114, representing one or more sensors as described above, such as an accelerometer and/or a gyroscope. As used herein, "external" means a sensor that is not integrated with SPU 106 and may be remote or local to device 100. Also alternatively or in addition, SPU 106 may receive data from an auxiliary sensor arrangement 116 configured to measure one or more aspects about the environment surrounding device 100, and which may also implement motion sensors or may feature other sensors. For example, a pressure sensor and/or a magnetometer may be used to refine motion determinations made using internal sensor arrangement 112. In one embodiment, auxiliary sensor arrangement 116 may include a magnetometer measuring along three orthogonal axes and output data to be fused with the gyroscope and accelerometer inertial sensor data to provide a nine axis determination of motion. In another embodiment, auxiliary sensor arrangement 116 may also include a pressure sensor to provide an altitude determination that may be fused with the other sensor data to provide a ten axis determination of motion. At least one of internal sensor arrangement 112, external sensor arrangement 114 and/or auxiliary sensor arrangement 116 also includes a temperature sensor because changes in temperature are known to affect calibration. In one aspect, the temperature sensor may be integrated into the same sensor arrangement as the sensor being calibrated to improve accuracy. Although described in the context of one or more sensors being MEMS based, the techniques of this disclosure may be applied to any sensor design or implementation. Depending on the embodiment, any sensor of internal sensor arrangement 112, external sensor arrangement 114 and/or auxiliary sensor arrangement 116 may be calibrated according to the techniques of this disclosure.

In the embodiment shown, host processor 102, memory 104, SPU 106 and other components of device 100 may be coupled through bus 118, while sensor processor 108, memory 110, internal sensor arrangement 112 and/or auxiliary sensor arrangement 116 may be coupled though bus 120, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

Code, algorithms, routines or other instructions for processing sensor data may be employed by control module 122, schematically represented in this figure as being stored in memory 104 for execution by host processor 102, to perform any of the operations associated with the techniques of this disclosure. As will be discussed in further detail below, control module 122 monitors the operational state of device 100 as well as the calibration state of one or more of the device sensors. Control module 122 may also generate requests regarding the operation of device, such as by issuing a stop request when it is determined calibration is warranted. For example, control module 122 may exchange information with the control software of the device related to the operational state of device 100. Still further, control module 122 may identify conditions that could interfere with sensor calibration based on input from the sensors or other information. Alternatively, or in addition, the functionality of control module 122 may be implemented using sensor processor 108 and memory 110 or with any other distribution of processing resources available to device 100.

Any combination of sensor components of device 100 may be formed on different chips or may be integrated and reside on the same chip. Likewise, the sensor components can be otherwise enclosed or covered to create a unitary package. A chip may be defined to include at least one substrate typically formed from a semiconductor material. A single chip or package may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Control module 122 implements at least two types of calibration. An initial calibration may be carried at the beginning of a given operating period, before device 100 starts moving. Subsequent calibrations are then carried out dynamically when needed to maintain a desired degree of accuracy, such that degradation in expected or measured accuracy of the sensor triggers these dynamic calibrations. One suitable trigger for dynamic calibration includes a threshold interval representing sufficient time that it would be expected that bias, sensitivity or any other calibration parameter has become outdated and no longer valid. Another trigger is when a sufficient change in temperature is detected, as it can similarly be expected that calibration at the previous temperature is no longer valid given that temperature is known to affect calibration parameters such as bias and sensitivity. Although calibration can be triggered based on temperature change alone, a more refined trigger can be based on estimating an accumulated heading error as a function of temperature so that calibration can be signaled when the estimated error exceeds a threshold. Further details of this aspect are provided below. Yet another suitable trigger can be based on evaluating the sensor measurements for performance degradation beyond an acceptable threshold. Control module 122 also identifies external conditions affecting device 100 that may interfere with calibration, including disturbances such as application of external forces, shocks or non-stationarities during a period when calibration is pending. Control module 122 can cause device 100 to enter a protection mode and defer calibration until the conditions are suitable. Conversely, control module 122 can also identify when conditions are suitable for calibration, such as when device 100 is not moving, and opportunistically perform a calibration routine even if not yet needed or indicated by other triggers. This reduces the need to disrupt device operation solely for calibration.

Calibration may require that the device is in a certain operational state. For example, some sensor calibration may require a motion state where the device stops moving. The operational state may also include other factors, such as whether mechanisms other than the propulsion system are powered on or off. Based on the dynamic triggers discussed above, control module 122 may change the status of a stop request when it determined device 100 should cease motion so that calibration can be performed. Upon confirming that device 100 has stopped moving, control module 122 starts calibration and recalculates sensor bias or other parameters. When the calibration is finished, the stop request is cleared so that device 100 can resume operation, such as in the example of a robotic cleaning device by giving the command to start cleaning again. As indicated above, calibration may be either active or passive. Signaling by control module 122 to start or stop operation of device 100 may be considered active. The start-and-stops of device 100 are initiated by control module 122 with the stop request and the host applications governing device 100 react to the request. Passive calibration occurs when control module 122 recognizes that device 100 is not moving and starts and stops the calibration based on this condition. As desired, a stop request may still be generated during passive calibration to ensure that the routine finishes before device 100 resumes motion.

Figure 2:
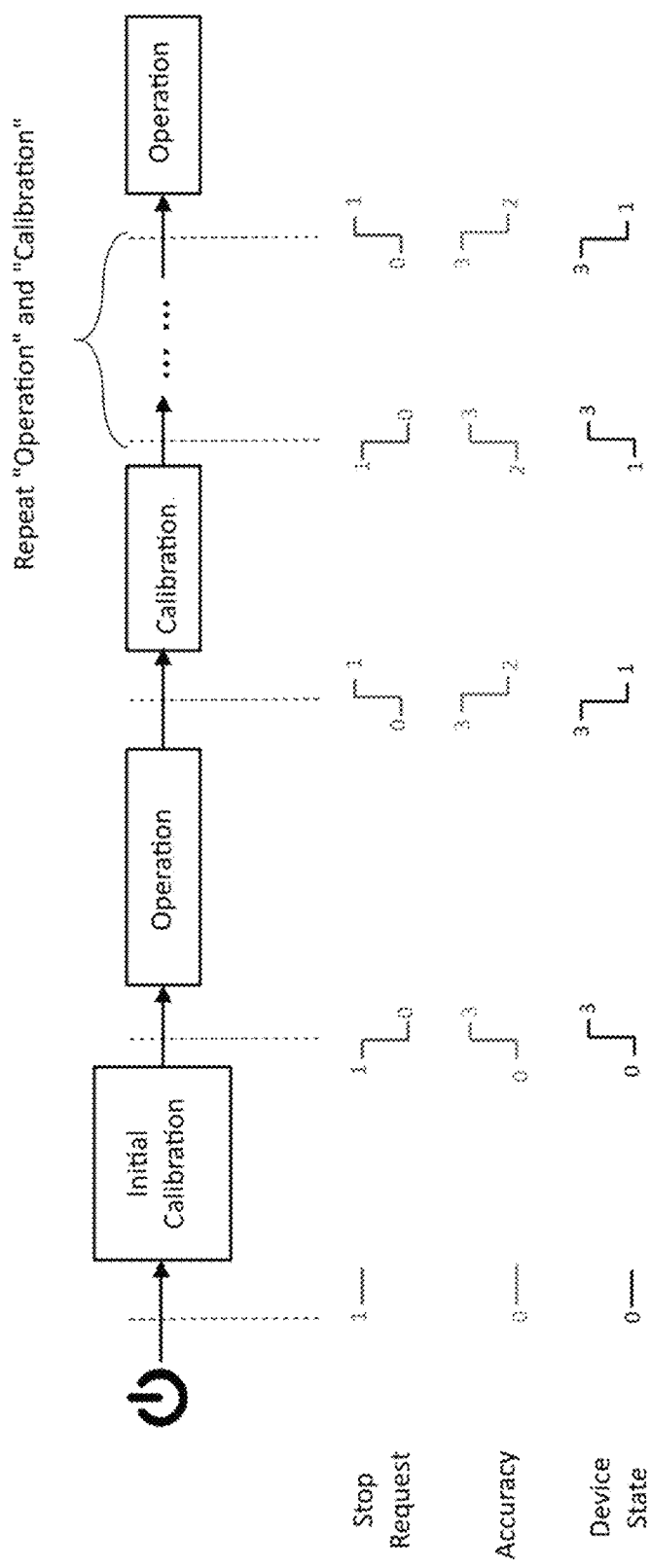
FIG. 2 is an exemplary state diagram of mobile robotic device operation and calibration according to an embodiment.

To help illustrate aspects of this disclosure, FIG. 2 is an exemplary state diagram showing an initial calibration followed by subsequent dynamic calibrations and the associated states of device 100. Right after device 100 is powered on for an operation run, control module 122 calls for an initial estimation of the bias of the sensors and other calibration parameters as desired before starting the run. The initial calibration is therefore carried out when any motors or other mechanics are still powered off (device state=0). In one embodiment and for the purposes of illustration alone and not limitation, the initial calibration requires 5 seconds to calibrate, during which device 100 should be completely stationary and free of any vibration or other artifacts that could be cause by the motors or mechanics. Once the initial calibration is completed, the stop request changes to 0. It is then safe for device 100 to start its operational run and to set the device state to 3, with the device in motion and all mechanics in permitted operation. Once more in the context of robotic cleaner, device state 3 can indicate device 100 is moving and its vacuum is energized.

Subsequent dynamic calibrations may then be scheduled as follows. Depending on the accuracy of the calibration, which can be dependent on any of the triggers discussed above, control module 122 issues a stop request as shown. The stop request may comprise a request for device 100 to just stop moving, but the motor and other mechanics may stay on. Alternatively, the stop request may comprise a request for device 100 to stop moving and stop the motor and other mechanics. This latter request means that no vibrations due to the motor are present, thereby enabling easier calibration. The type of request may also depend on the deviation of the sensor values from the desired values. In another embodiment, the calibration may be done opportunistically, for example when device 100 changes direction. When changing direction device 100 may stop moving for the amount of time required for the calibration. This opportunistic calibration may be requested, and this may affect the navigation/motion of device 100 so that the chosen path enables calibration at a certain time or at a plurality of times. The navigation module may select the path based on the calibration requirements. When device 100 stops moving and the device state changes to 1, reflecting that at least some mechanics (motors/vacuums/etc.) are operating but the device is not in motion. This may include control module 122 monitoring the actual motion of device 100, such as by using the motion sensors, to confirm that motion has ceased. The calibration algorithm will be started, such as by reevaluating the sensor bias over the entire time length where the device state remains 1. The calibration finishes when the device state changes back again to 3. Sensor bias and/or other calibration parameters are updated at the end of successful calibration. As soon as the update is available, the stop request is cleared. If the device state ignores the change of the stop request and remains 1, the evaluation will continue being updated until the device state switches back to 3. Optionally, the algorithm may be protected from overflow in the case of very long calibration duration.

Figure 3:
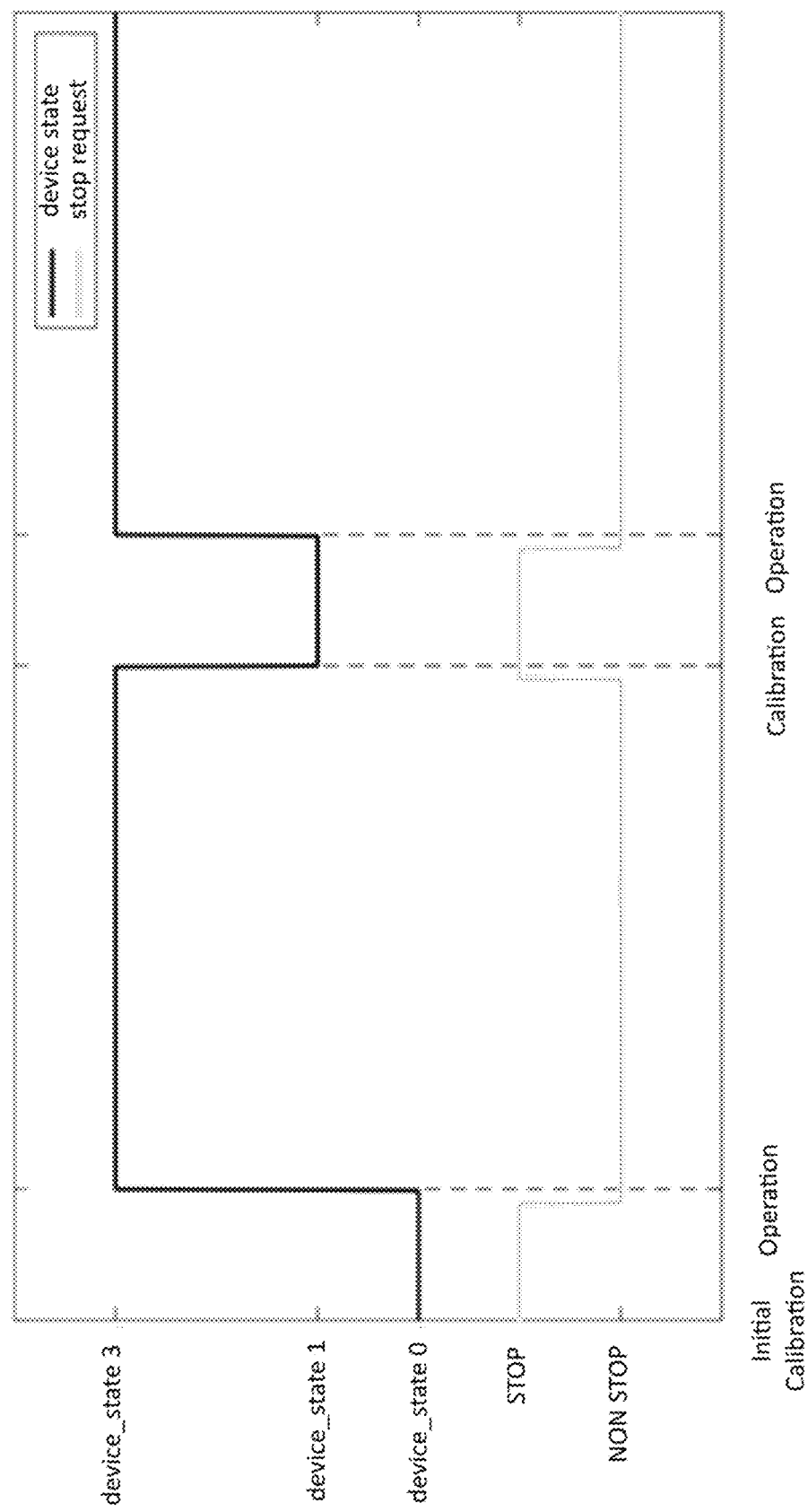
FIG. 3 is an exemplary timing diagram showing the relationship between device state, stop request and calibration according to an embodiment.

Next, FIG. 3 schematically depicts a timing diagram showing the relationship between device state and stop request. Preferably, device operation corresponding to the device_state=3, namely full operation with motion and other mechanics, occurs with the sensors well calibrated, a state represented by stop request=0 and accuracy flag=3. The higher the accuracy flag, the better the accuracy of the sensor data. When the accuracy drops below a certain threshold, the calibration may be requested. This threshold may depend on external factor that determines the accuracy. For example, the host application can trigger the calibration at any moment by changing the device state, as control module 122 can be configured to passively initiate calibration when device state is 0. Alternatively, control module 122 can actively control the triggering automatically based on the accuracy flag using desired conditions. The accuracy flag may be computed by control module 122 as an indicator of the credibility of calibration (greater value means better accuracy). To guarantee the desired performance of the quaternion estimation or other sensor-derived outputs, a stop request will be triggered as soon as the accuracy flag drops below 3. As noted, the stop request and the accuracy flag may be dependent on a temperature condition, including a temperature change that exceeds a threshold, a time condition when calibration parameters are either unavailable or outdated, an estimated accumulated heading error that exceeds a threshold, and other suitable triggers. Accuracy can also be measured by analyzing the sensor measurements directly, using any suitable technique. As one illustration, if device 100 is expected to be motionless, the sensor measurements can be checked for consistency. Any deviation may be due to noise or to a need for calibration, which can be distinguished by using an appropriate window for observation. Table 1 illustrates the triggering of a stop request dynamically when the current temperature, $T_{now}$, and the temperature recorded during the last calibration, $T_{last}$, present a sufficient change, with the accuracy flag changing accordingly, depending on the amount of change:

TABLE 1

| Temperature condition | Stop request | Accuracy flag |
|---|---|---|
| 10° C. ≤ $\|T_{now} - T_{last}\|$ < 20° C. | 0 → 1 | 3 → 2 |
| $\|T_{now} - T_{last}\|$ ≥ 20° C. | 0 → 1 | 3 → 1 |

Under the condition that device 100 refuses or fails to stop following the stop request, which can be determined by control module 122 monitoring the motion state as noted above, it may experience a greater change and performance may degrade further. Correspondingly, in this embodiment, the accuracy will drop to 1 if the temperature change is over 20° C. It should be appreciated that the temperature changes of this embodiment are for illustration only and any suitable values may be used to achieve the desired level of performance. Likewise, Table 2 illustrates the triggering of a stop request dynamically based on elapsed time since the last calibration, $t_{last}$:

TABLE 2

| Time condition | Stop request | Accuracy flag |
|---|---|---|
| Dynamic: $t_{now} - t_{last}$ ≥ 600 s | 0 → 1 | 3 → 2 |

When the thresholds of the time condition are crossed, the stop request will be triggered to require a dynamic calibration. $t_{last}$ will be updated as the same time as the new calibration result is available. Therefore, the dynamic time condition can be triggered at a regular time interval. When the calibration is completed, the stop request is cleared (1→0) and the accuracy is set to 3. Once more, the indicated interval should be viewed as being one example of a suitable value, but other periods may be employed as desired.

Figure 4:
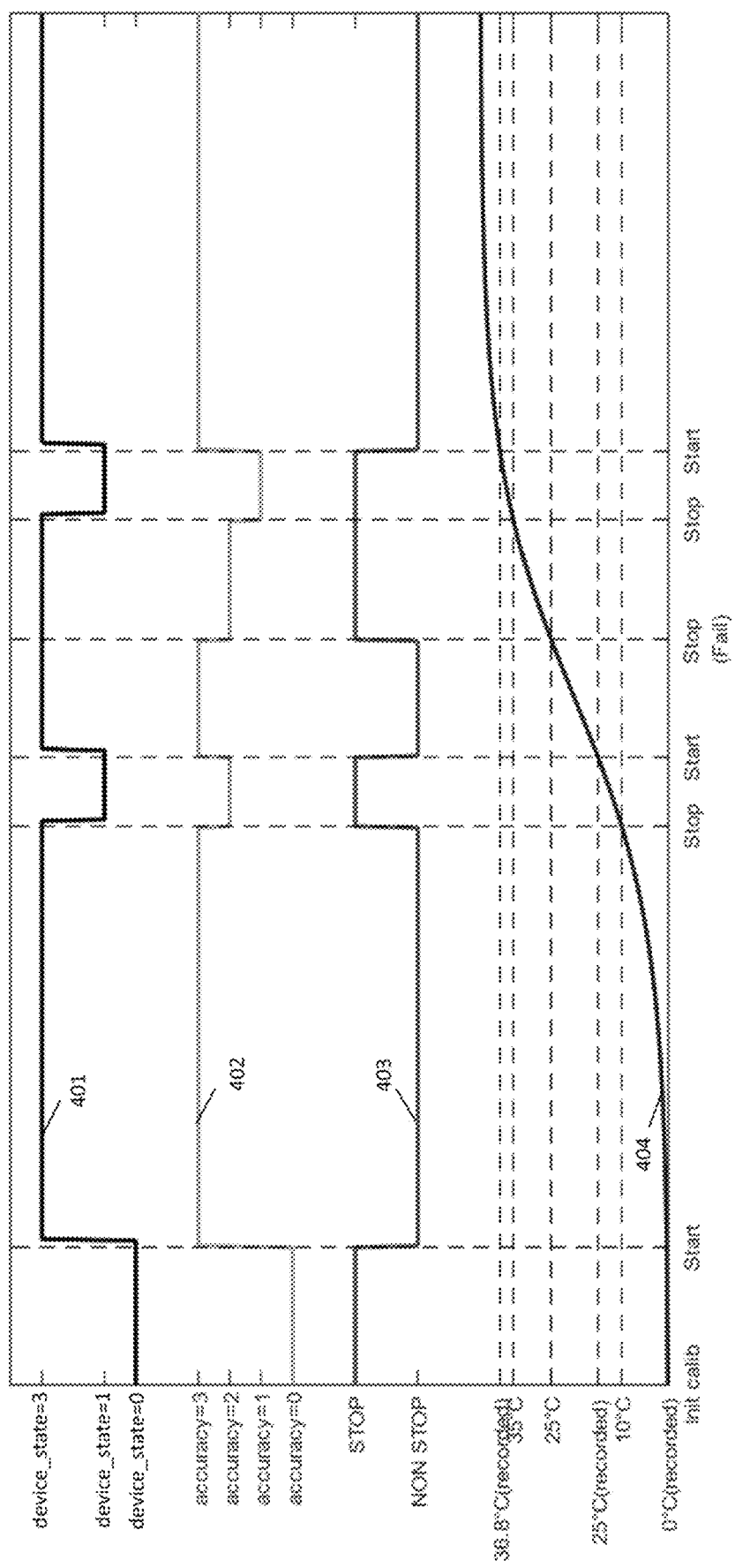
FIG. 4 is schematic diagram of calibration triggering based on temperature change according to an embodiment.
Figure 5:
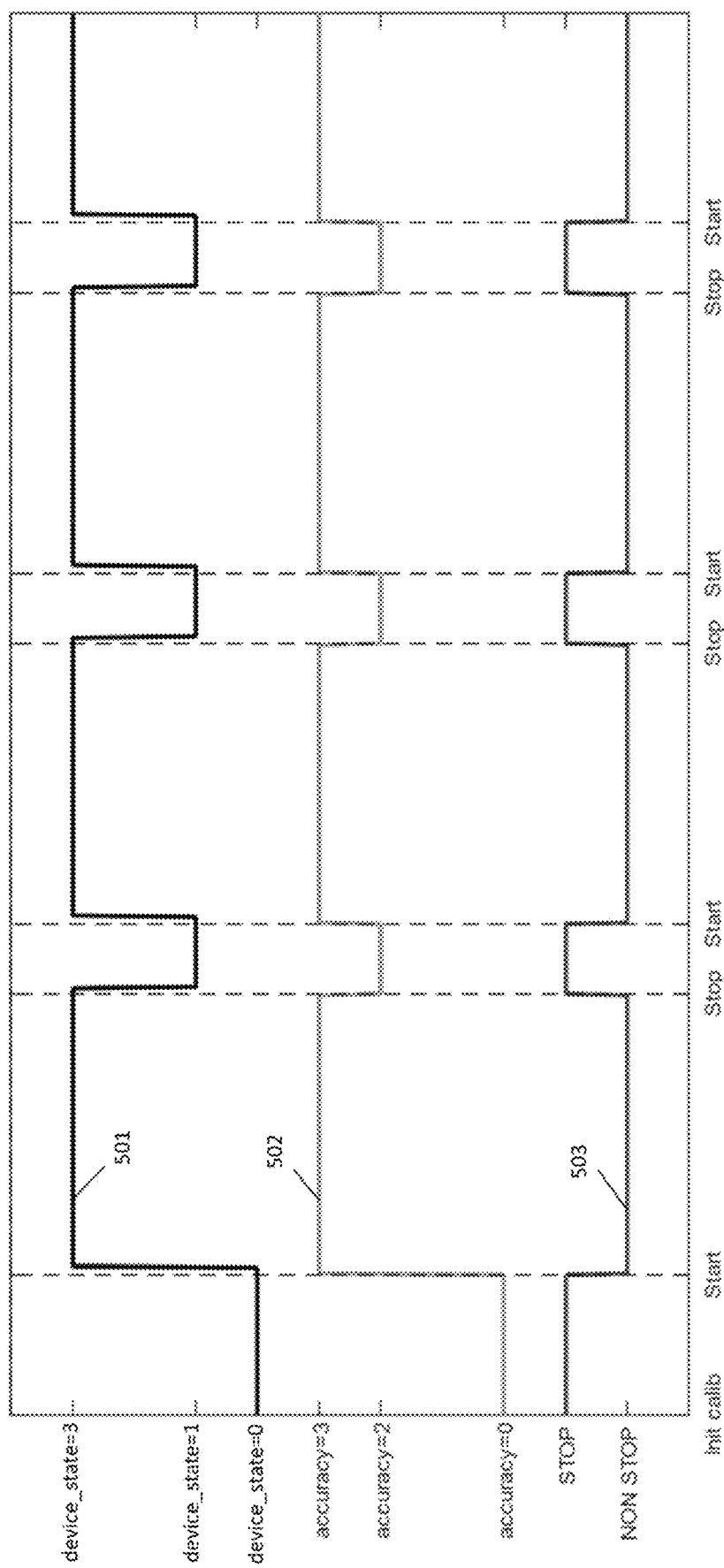
FIG. 5 is schematic diagram of calibration triggering based on time intervals according to an embodiment.

Implementation of these triggers is schematically depicted in FIGS. 4 and 5. Specifically, FIG. 4 shows the triggering of a stop request based on a temperature condition, with trace 401 corresponding to device state, trace 402 corresponding to the accuracy flag, trace 403 corresponding to the stop request and trace 404 showing the measured temperature. The temperature is recorded at the end of calibration as $T_{last}$. 3 stop requests are triggered due to the temperature condition. When the device fails to react to the second stop request, which can be confirmed by the monitoring of control module 122, the accuracy drops to 1 as a result, given that the temperature change exceeds the second threshold (20° C.). In turn, FIG. 5 shows the triggering of a stop request based on a time condition, with trace 501 corresponding to device state, trace 502 corresponding to the accuracy flag and trace 403 corresponding to the stop request. As shown, the stop requests are triggered at regular time intervals.

Furthermore, the techniques of this disclosure allow for a more refined calibration trigger to be based on temperature change. Rather than relying solely on temperature change alone, the effect of temperature on an orientation component derived from the sensor measurements can be estimated and used to trigger calibration. The following discussion is in the context of accumulated heading error, but the techniques can be extended to other orientation components as desired. Specifically, the heading error $\Delta\theta_T[n]$ can be regarded as an N-th order polynomial relationship of the cumulation of temperature induced error as indicated by Equation (1):

$$\Delta\theta(t_1 \to t_2) = \int_{t_1}^{t_2} (\alpha_N T(t)^N + \alpha_{N-1} T(t)^{N-1} + \ldots + \alpha_0) dt$$

One exemplary embodiment of such a relationship is given by Equation (2), representing a linear relationship where $\Delta t$ is the sampling time, k a constant, T[n] is the current temperature and $T_C[n]$ the temperature during the latest calibration before time n:

$$\Delta\theta[n] \approx \Delta\theta_T[n] = \Sigma_n k(T[n] - T_C[n])\Delta t \quad (2)$$

Figure 6:
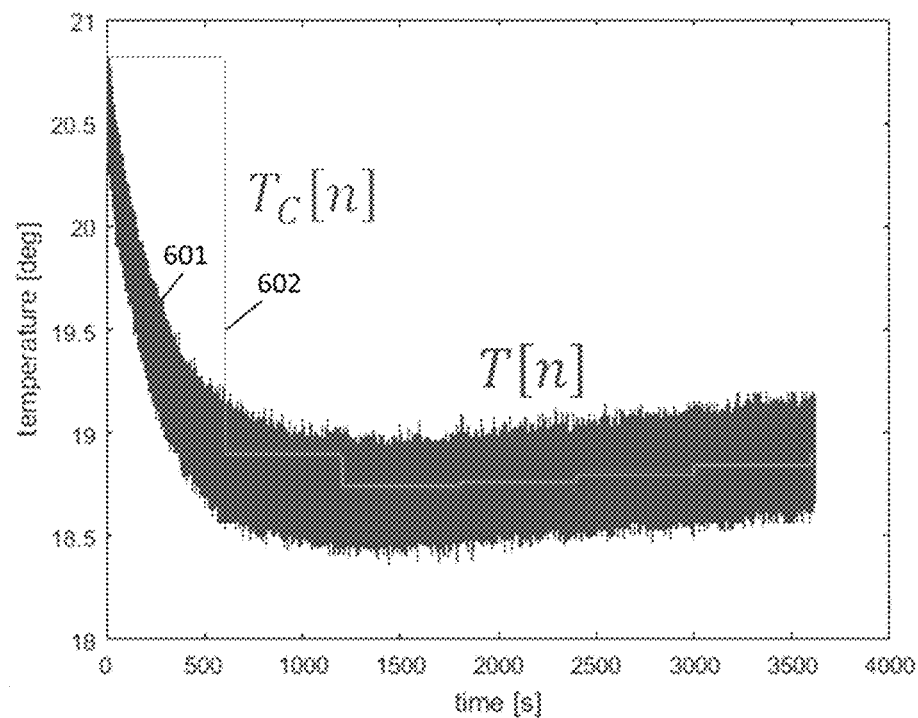
FIG. 6 graphically depicts the difference between current temperature and the last calibration temperature according to an embodiment.
Figure 7:
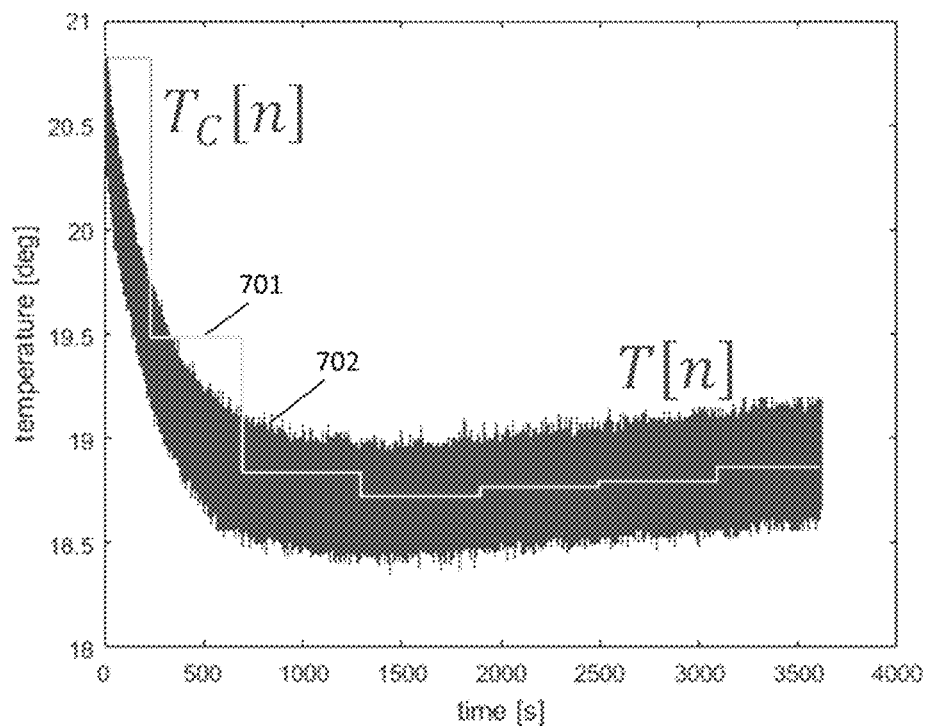
FIG. 7 graphically depicts the difference between current temperature and the last calibration temperature after calibrating using a reduced threshold in accumulated heading error according to an embodiment.

The constant k may be determined empirically, statistically or modeled using linear relationships. A schematic depiction of this relationship is shown in FIG. 6, where trace 601 represents current temperature T[n] and trace 602 represents the last calibration temperature $T_C[n]$. From Equation (2), it will be appreciated that the accumulated heading error can be conceptualized as the area between trace 601 and 602, corresponding to an integration of the difference. By setting a lower threshold for the estimated accumulated heading error and thereby recalibrating at the temperature when that threshold is exceeded, the last calibration temperature $T_C[n]$ tracks the current temperature T[n] more closely, as depicted in FIG. 7 where trace 701 represents current temperature T[n] and trace 702 represents the last calibration temperature $T_C[n]$. Since this lower threshold results less area between trace 701 and 702, this technique reduces the accumulated heading error and provides more accurate sensor performance by calibrating more often in view of the effect of the temperature change on accuracy rather than the temperature change alone.

Figure 8:
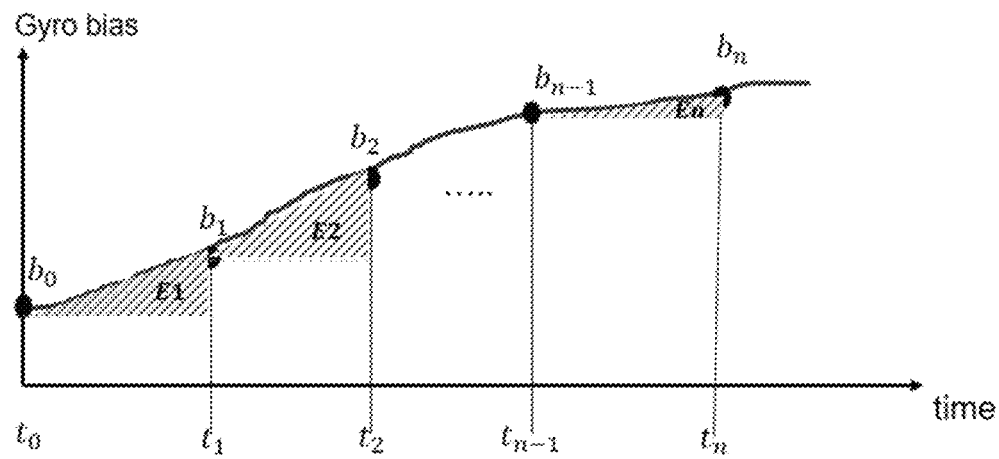
FIG. 8 graphically depicts heading error due to changing bias over time according to an embodiment.
Figure 9:
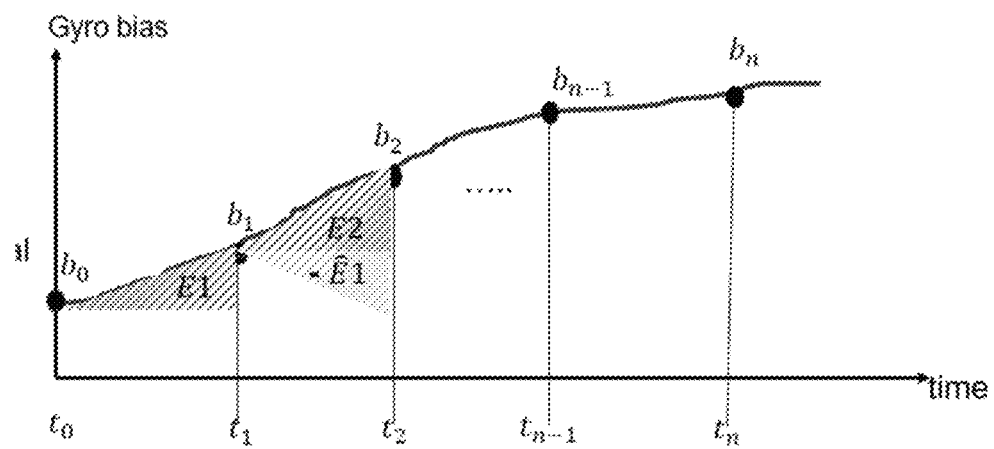
FIG. 9 graphically depicts heading error due to changing bias over time with iterative compensation according to an embodiment.

In light of these characteristics, it may be desirable to apply an iterative correction to help compensate for the heading error in an operation that is independent of the calibration. To help illustrate, FIG. 8 schematically depicts gyroscope bias over time with changing temperature, with an error associated over each calibration interval. In particular, $t_0, t_1 \ldots t_n$ are the bias update instants when calibration was performed, with $b_0, b_1 \ldots b_n$ the respective bias calculations at those instants. Since calibration is not being performed continuously, an error is associated with each calibration interval given that the previously determined bias is being used even though the bias is continuously changing. As shown, these errors may be represented by the difference between the actual bias and the previously calculated bias, graphically indicated as En for each interval, with the heading error at instant $t_n$ equal to $E1+E2+\ldots En$. Accordingly, heading accuracy can be improved by recognizing and compensating for this error. One suitable technique is schematically depicted in FIG. 9, in which the error occurring in a specific time interval (in between 2 bias updates) is iteratively estimated and then compensated in the next time interval. Notably, this simplified example assumes $t_0, t_1, \ldots t_n$ are regularly spaced, i.e. $(t_n-t_{n-1})=(t_{n-1}-t_{n-2})=\ldots=(t_1-t_0)=\Delta T$ for clarity, but the process can adapted to irregular time intervals. At $t_1$, bias $b_1$ is calculated and the error estimated in the time period $[t_0, t_1]$ to be $\hat{E}1=(b_1-b_0)\Delta T$. In the time interval $[t_1, t_2]$, instead of assuming the bias is constant and equals to $b_1$ (bias=$b_1$), a corrective element is added to compensate for the error E1 accumulated in the previous phase as $$\text{Bias} = b_1 - \left(\frac{\hat{E}1}{\Delta T}\right) * (t - t_1).$$

It will be appreciated that the shaded portion of the graph labeled $-\hat{E}1$ corresponds to the correction quantity of the error E1 accumulated in time interval $[t_0, t_1]$. Therefore, the overall error at $t_2$ is reduced and corresponds to $E1+E2-\hat{E}1 \approx E2$. The procedure is repeated over all time intervals so that the final heading error at $t_n$ is $E1+(E2-\hat{E}1)+\ldots+(En-\hat{E}n-1) \approx En$. Effectively, rather than allowing the heading error to accumulate over all intervals, it is limited to the error occurring only in the previous/last interval.

As desired, the past history of calibration estimates of the bias (or other parameters) may be stored in a buffer/memory, and either a linear or a polynomial fit is performed on the past history of the bias. Correspondingly, the trend of the bias may be determined as a function of time, temperature or any other suitable parameter. A predictive bias is calculated from this curve fit by extrapolating beyond the last known bias or interpolating between known biases. Using these techniques, a bias is predicted at each time step beyond the last known bias. During operation, the predicted bias is gradually applied to the sensor processing unit at each corresponding time step. This process is continued until a new bias is estimated upon a stop request and a new calibration is calculated. The procedure repeats for the next cycle by incorporating the latest calibrated bias value to the buffer of calibration estimates, and a new curve fit is performed. Optionally, the model building process can be used as a further trigger for calibration by control module 122. In particular, when the calibration parameter(s) for a current temperature is unknown, rather than predicting the calibration parameter, control module 122 can instead issue a stop request so that the calibration parameter can be calculated by performing a calibration routine. Although it will often be desirable to use the predicted calibration parameter from the built model to avoid disruptions to the operation of device 100, there may be certain temperatures for which it would be beneficial to calculate the calibration parameters in order to improve the model. For example, if the current temperature is sufficiently different from historical recorded temperatures, it may be worth disrupting operation of device 100 in order to perform the calibration routine to calculate the calibration parameter for that temperature. Conversely, if the temperature is close to one or more already recorded temperatures, it may be desirable to rely on the model for prediction rather than disrupting operation. The model can also be evaluated based on future calibrations, as any deviation between the bias predicted by the model and a calculated calibration relates to the performance. Depending on the evaluation, greater or lesser numbers of calibrations may be scheduled to adapt, renew, or add points for the temperature curve. The time since the last calibration at a specific temperature can also be used to determine if a new calibration at the temperature is desirable, as even if calibration was performed at the current temperature and is in model, the calculated parameters can be verified or updated if a change has occurred. Alternatively, the need to buffer historic biases may be avoided by using a new estimated bias in a recursive manner to update the polynomial curve of order N representing the relationship between temperature and bias. A convergence to a meaningful curve will happen after N+1 bias points are captured. After that, the curve can continue to be recursively updated with any new bias estimations.

Figure 10:
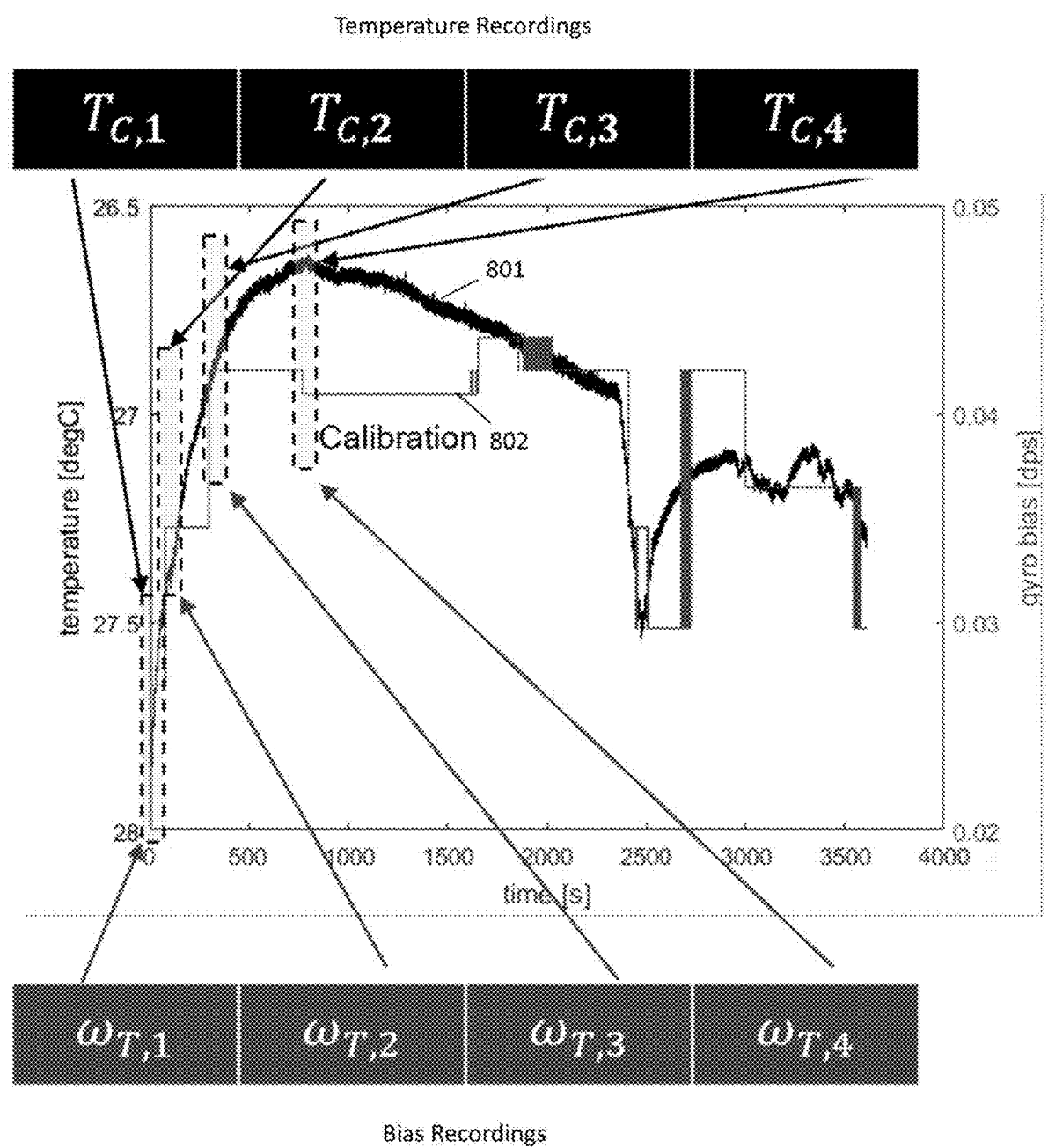
FIG. 10 graphically depicts the usage of recorded temperature and bias measurements for building a predictive model according to an embodiment.

To help illustrate, FIG. 10 schematically depicts bias prediction and model building for a gyroscope with respect to temperature. As shown, trace 801 represents current temperature T[n] and trace 802 represents the estimated bias $\omega_T$ from the most recent calibration. Four dynamic calibration operations are indicated by the dashed boxes, providing the biases $\omega_{T,1}, \omega_{T,2}, \omega_{T,3}$ and $\omega_{T,4}$, corresponding to the calibration temperatures $T_{C,1}, T_{C,2}, T_{C,3}$ and $T_{C,4}$. By keeping historical recordings of the bias $\omega_T$ and the corresponding temperature $T_C$ a model of the bias $\omega_T$ as a function of the temperature $T_C$ can be constructed, either as a linear or higher-order polynomial/nonlinear relationship or by using the alternative recursive technique noted above. Correspondingly, an unknown bias can be predicted given the current temperature T by the model as indicated by the portions of the graph subsequent to the four dynamic calibrations shown. In particular, the bias 802 at these times is predicted based on the model and the current measured temperature.

Figure 11:
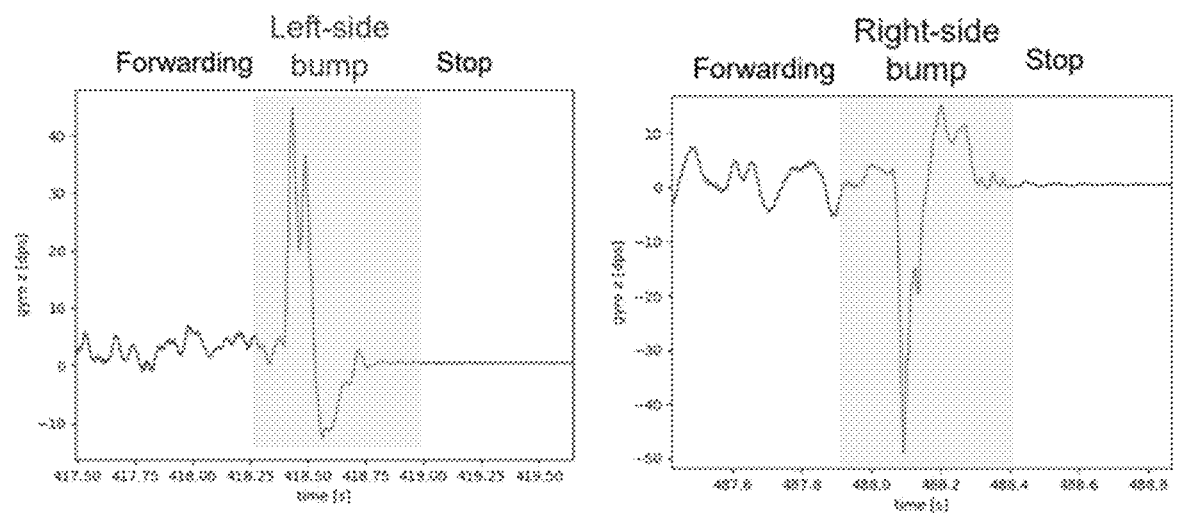
FIG. 11 graphically depicts sensor signals associated with the detection of an impact context for the mobile robotic device according to an embodiment.
Figure 12:
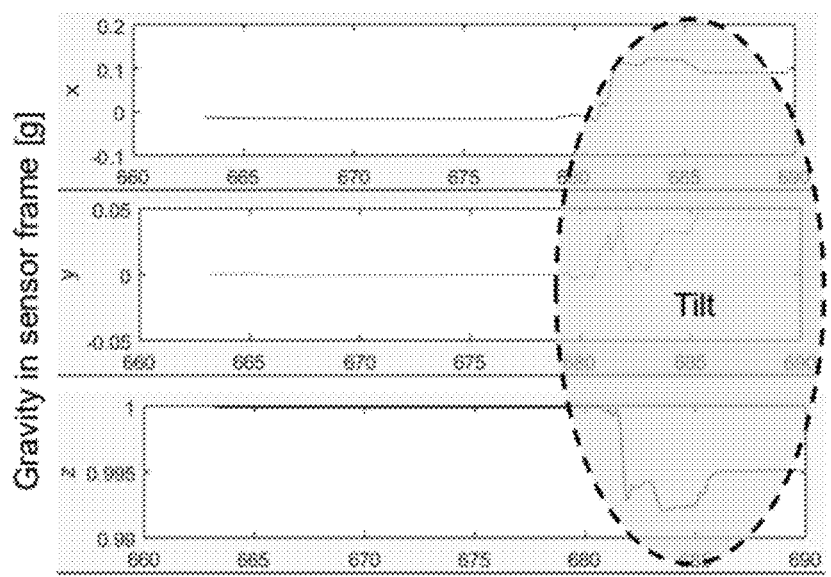
FIG. 12 graphically depicts sensor signals associated with the detection of a tilt context for the mobile robotic device according to an embodiment.
Figure 13:
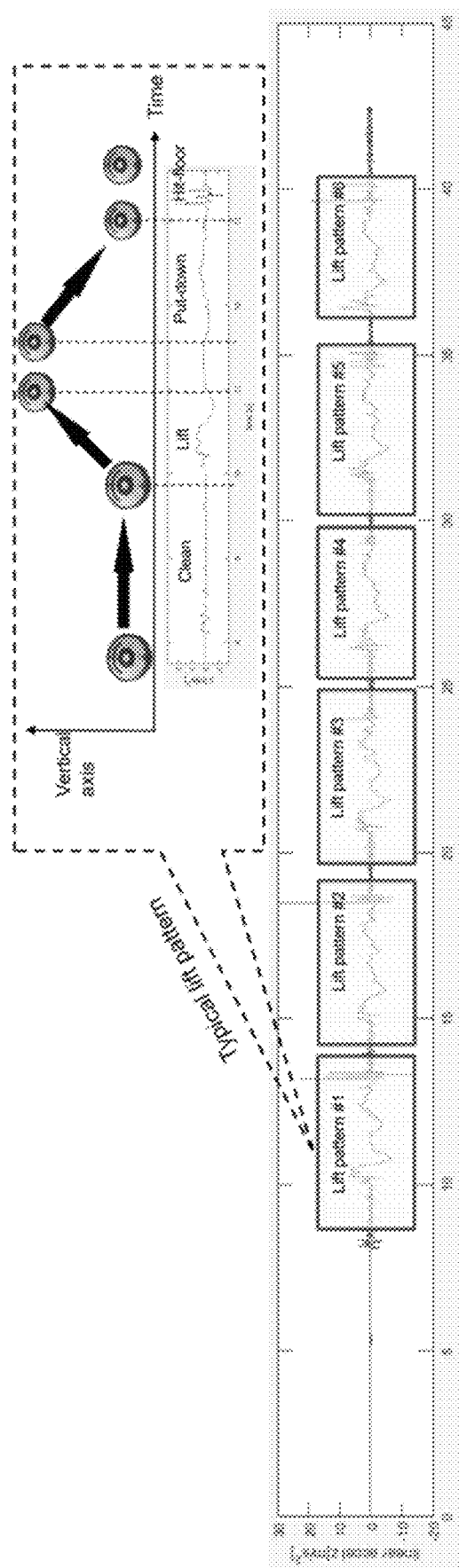
FIG. 13 graphically depicts sensor signals associated with the detection of a lift context for the mobile robotic device according to an embodiment.
Figure 14:
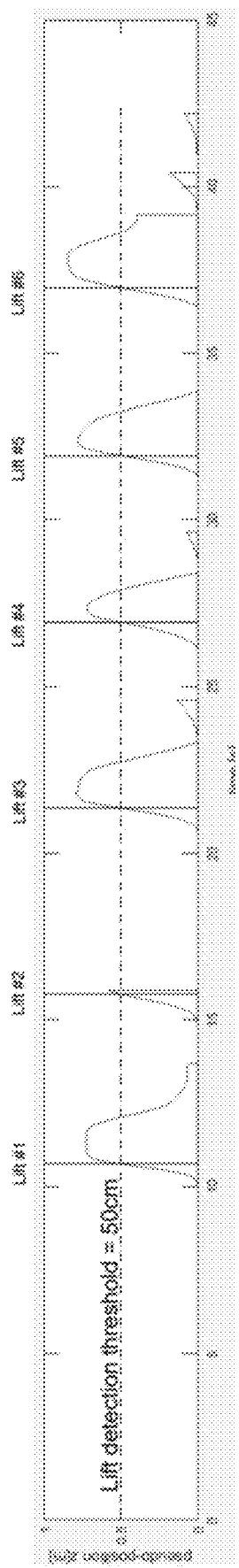
FIG. 14 graphically depicts the vertical displacement associated with the detection of a tilt impact context for the mobile robotic device according to an embodiment.

As noted above, control module 122 may also monitor external conditions that may affect device 100. These can be interpreted as different contexts that may influence calibration or other aspects of device operation. For example, a number of contexts may be determined based on motion sensor data from device 100. As one illustration, FIG. 11 schematically depicts the signal from the z-axis gyroscope when device 100 experiences left-sided and right-sided impact contexts as indicated. The angle of impact, direction of impact, and the force of impact can be deduced from the gyroscope signal. This information may be used by controller 122. Another illustration is given in FIG. 12, which schematically depicts the x-, y- and z-axes accelerometer signals representative of a tilt context, such as when device 100 is traveling over an object in the environment and potentially gets stuck. Yet another illustration is given in FIGS. 13 and 14 of detecting a lift event context. In particular, FIG. 13 schematically depicts different patterns in vertical acceleration for a robotic cleaner embodiment with a detail view of the first pattern showing the correspondence to the sequence of lifting conditions. Similarly, FIG. 14 shows the vertical displacement, such as determined by integration of vertical acceleration, from pressure sensor information or others, with the detection of a lift context triggered by vertical displacement exceeding a suitable threshold (50 cm in this illustration, but other values may be used as suitable). If desired, a threshold speed of vertical displacement can also be used to detect a lift context. Depending on the identified context, control module 122 can either request or prevent calibration. For example, an impact can affect calibration parameters, so it may be desirable to request calibration after an impact context is detected. Conversely, a tilt context may interfere with proper calibration and control module 122 can defer calibration under this condition. Similarly, any context that may involve unwanted motion can also be a factor for delaying calibration.

In addition to the use of context detection with respect to calibration, the techniques of this disclosure also recognize that such information can also be used for other aspects of device operation. As one illustration, the impact contexts depicted in FIG. 11 may be used to replace mechanical bumpers conventionally used for object detection, thereby reducing the bill of materials. Device 100 may be configured to change direction or reverse direction when an impact is detected. By using motion sensors, the angle of the impact can be determined from the motion sensor readings, and may further help to determine the best trajectory after the impact. The motion signature of the impact may also be used to determine what type of object was involved in the object (classification of object/impact). The shock detection may be performed using an accelerometer and/or a gyroscope, for example by comparing a deceleration to a predefined threshold, or detecting an acceleration above a certain threshold, or detecting a sudden change in direction. The motion sensors may also be used to determine an energy of the shocks/impact, and may be used to classify the shocks. Different shocks may have different reactions (scenarios). The gyroscope signal may be used to determine the angle of the impact by investigating the magnitude of the signal (i.e. rotation angle/speed). In addition, the shock energy can be used to determine the angle of impact. For example, a large shock with a small rotation means a low angle of impact (close to perpendicular), while a small shock with a large rotation, means an off-center impact.

Other illustrations are provided by the tilt context. Device 100 may not only encounter large object that blocks its path, but may also encounter smaller object that it may, or may not, be able to roll over, such as e.g. a cable on the floor, resulting in the tilt context depicted in FIG. 12. These kinds of objects may be difficult to detect by conventional object detection methods such as bumpers or (optical) proximity sensors. The motion signature detected by the motion sensors when encountering such objects may help with navigation, classifying object, and avoiding object (in future). For example, when device 100 encounters a cable that it can roll over, a typical motion signature would be a bump/impact followed by a change in tilt as the robot rolls over the cable and can help determine the exact position and orientation of the robot. Based on the detected impact and orientation, the robot may determine an exit strategy, such as a decision to try to keep moving forward, to try to back up, or to continue at a certain angle, which may be determined from the detected impact parameters. Similarly, when device 100 encounters a drop off, one or more wheels may suddenly be lower, the motion signature for these events can also be recognized. Thus, a library of motion signatures may be used to recognize certain situation or events. The motion signatures may also be combined/fused with data and signatures from other sensors such as proximity sensor, IR sensors, ultrasonic sensors etc. The motion signature and object classification may also help determine 'exit strategies' when device 100 gets stuck on the object.

Yet other illustrations relate to the lift context. As discussed with regard to FIGS. 11 and 12, a lift can be detected as a signature pattern using accelerometers and/or other sensors, such as when performing sensor fusion with gyroscope measurements or using pressure sensors for example. When a lift is detected, actions may be taken, such as switching off the vacuum cleaner or brushes, or putting them in a lower power mode in a robotic cleaner embodiment. During the lifting, horizontal displacement may also be calculated, so that it can be determined where device 100 is put down compared to where it was lifted.

As discussed above, the dynamic calibrations are performed after the initial calibration and may occur while device 100 is not moving, but may still be influenced by mechanical operations. In the robotic cleaner embodiment, it may be desirable to keep the vacuum running for example. In other embodiments, various mechanical process may exist even when device 100 is not moving. Nevertheless, it is still desirable to be able to perform calibration under these conditions. As such, this disclosure employs statistical techniques to protect against non-stationarity events that if not recognized could degrade the calibration. Notably, under a vibration input, the gyroscope signal is dominated by a sinusoidal component of a constant and high frequency. The amplitude of the signal is proportional to the vibration intensity, which means that the envelope of gyroscope signal is quasi-constant in time. Detecting outliers and non-stationary points by setting a threshold on the peak-to-peak amplitude of the gyroscope signal is one suitable operation that may be performed. However, the vibration amplitude can be much higher and a statistical process, such as Grubbs's test, may be used to detect outliers under an arbitrary vibration amplitude. For example, the vibration of device 100, due to a motor, vacuum or other mechanical element, may vary due to a change in load. This can affect the vibrations and the frequency of the vibrations. Control module 122 is configured to detect external influences during the calibration to handle these variations.

Figure 15:
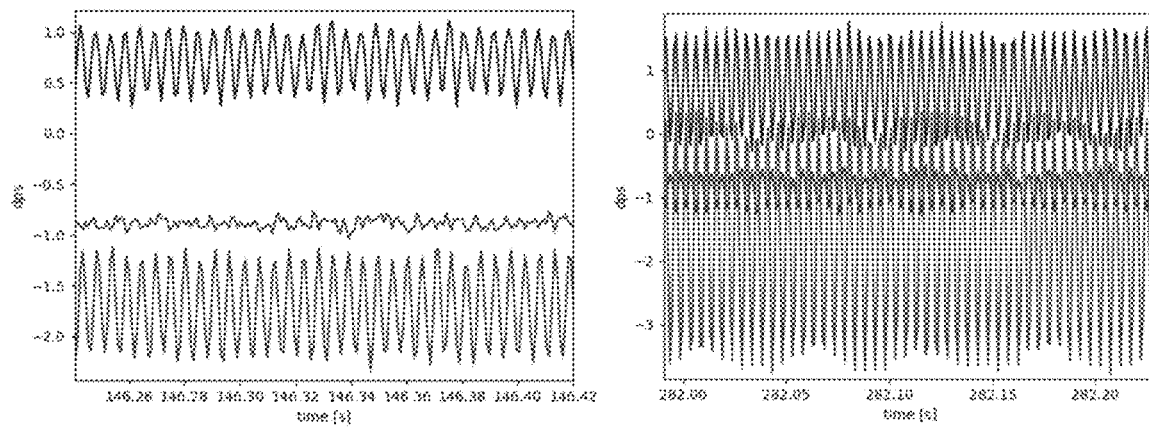
FIG. 15 graphically depicts two examples of gyroscope signals resulting from vibratory effects according to an embodiment.
Figure 16:
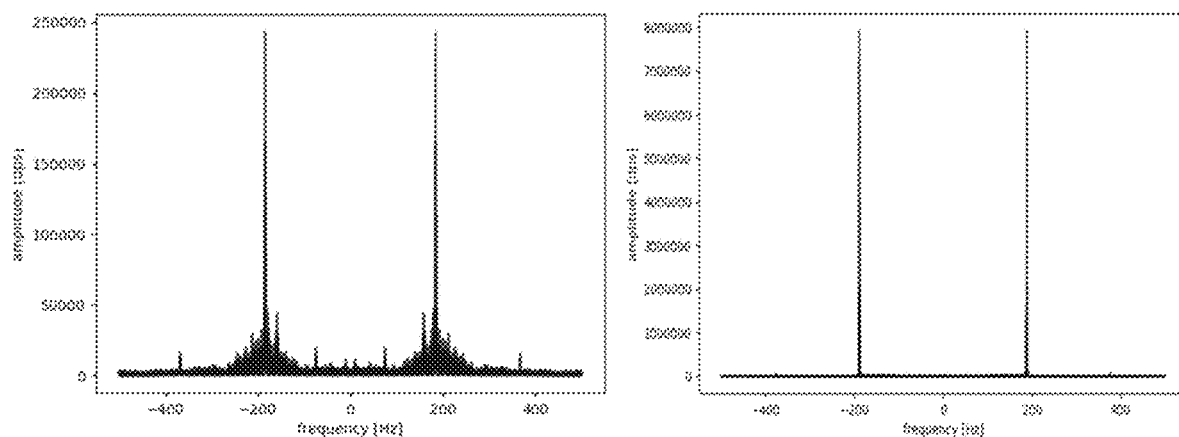
FIG. 16 graphically depicts the spectra of the signals shown in FIG. 15 according to an embodiment.

To help illustrate, FIG. 15 schematically depicts the outputs of a three-axis gyroscope under different vibration conditions (i.e. operational state), with the left graph showing relatively low peak-to-peak amplitudes and the right graph showing higher amplitudes. Further, FIG. 16 shows the respective spectra of the signals shown in FIG. 15. As can be seen, the vibration frequency is essentially the same for both, despite the higher amplitude in the right graphs. Grubb's test can be employed to detect artifacts that may result from these vibrations during calibration. For example, a shock or external force that may occur that is distinct from the vibration, a transition due to an abrupt change in angular speed, a cessation of rotation, or a variation in vibration amplitude, resulting from powering off a motor due to overcurrent. Using the techniques of this disclosure, these types of artifacts in the gyroscope signals under vibration of an arbitrary amplitude may be identified and consequently rejected as outliers. Concurrently, false detections can be avoided for the type of pure vibratory signals exemplified in FIG. 15. When artifacts are detected due to external influences, the calibration may be restarted or adapted. Alternatively, the quality of the calibration may be determined by taking into consideration those events. The quality of the calibration may determine when a next calibration is requested, what calibration should be performed next time, or the navigation/motion of device 100 may be adapted based on the quality of calibration. The sensor parameters, for e.g. the bias, determined during the calibration process may also be compared to previously determined bias values, if they exist. If the difference between the new value and the old values is too large, the confidence or accuracy of the calibration may be decreased. The bias may be an average of biases measured under comparable conditions, and the confidence of the calibration can be used as a weight for that bias in the calculation. For example, a gyroscope bias determined at a certain temperature can be compared to a bias determined previously at a comparable temperature, and if the difference is too large, the confidence in the new bias may be decreased, and its weight in an average bias determination may be decreased. Similarly, the newly determined sensor parameter may be compared to the existing model, and if the deviation from the model is too large, the confidence may be decreased.

Grubb's can be employed as a statistical test to detect outliers in a normally or pseudo-normally distributed population. The following material describes some principles of this test, but it should be recognized that the techniques can be modified or adapted as warranted and other similar statistical methods can be applied. As noted, the purpose of Grubb's test in this context is to protect a dynamic calibration routine that may be performed under conditions where device 100 is subject to vibration even though it may not be moving. Notably, this serves to protect the calibration against a gyroscope signal having a non-stationary input within the peak-to-peak threshold of the vibration that would not otherwise be excluded. The two-sided Grubb's test has the hypotheses H0: there are no outliers in the test and H1: there is one outlier in the data set. The hypothesis is retained if Equation (3) is satisfied, where $\bar{x}$ is the sample mean, std(x) is the standard deviation, $$t_{\frac{\alpha}{2N}, N-2}$$

is the upper critical value of the t distribution with N−2 degrees of freedom and significance level of $$\frac{\alpha}{2N}$$

$$\frac{\max_i |x_i - \bar{x}|}{std(x)} < \frac{N-1}{\sqrt{N}} \sqrt{\frac{t^2_{\frac{\alpha}{2N}, N-2}}{N-2+t^2_{\frac{\alpha}{2N}, N-2}}} \quad (3)$$

The threshold of the test may be treated as a constant k by using a fixed significance value and a fixed sample number, allowing for the simplification of setting $$k = \frac{N-1}{\sqrt{N}} \sqrt{\frac{t^2_{\frac{\alpha}{2N}, N-2}}{N-2+t^2_{\frac{\alpha}{2N}, N-2}}},$$

which allows Equation (3) to be written as Equation (4):

$$\frac{\max_i |x_i - \bar{x}|}{std(x)} < k \quad (4)$$

In turn, Equation (4) is equivalent to Equation (5):

$$\max\left\{\left(N * \max_i\{x_i\} - \sum_i x_i\right)^2, \left(\sum_i x_i - N * \min_i\{x_i\}\right)^2\right\} < k^2\left(N * \sum_i x_i^2 - \left(\sum_i x_i\right)^2\right) \quad (5)$$

For example, the tests may be carried out over a window of N=256 and α=0.95. When no outlier is detected in the window, the current bias can be restored, otherwise the calibration may be reinitiated and the previously stored bias may be used in the interim.

Figure 17:
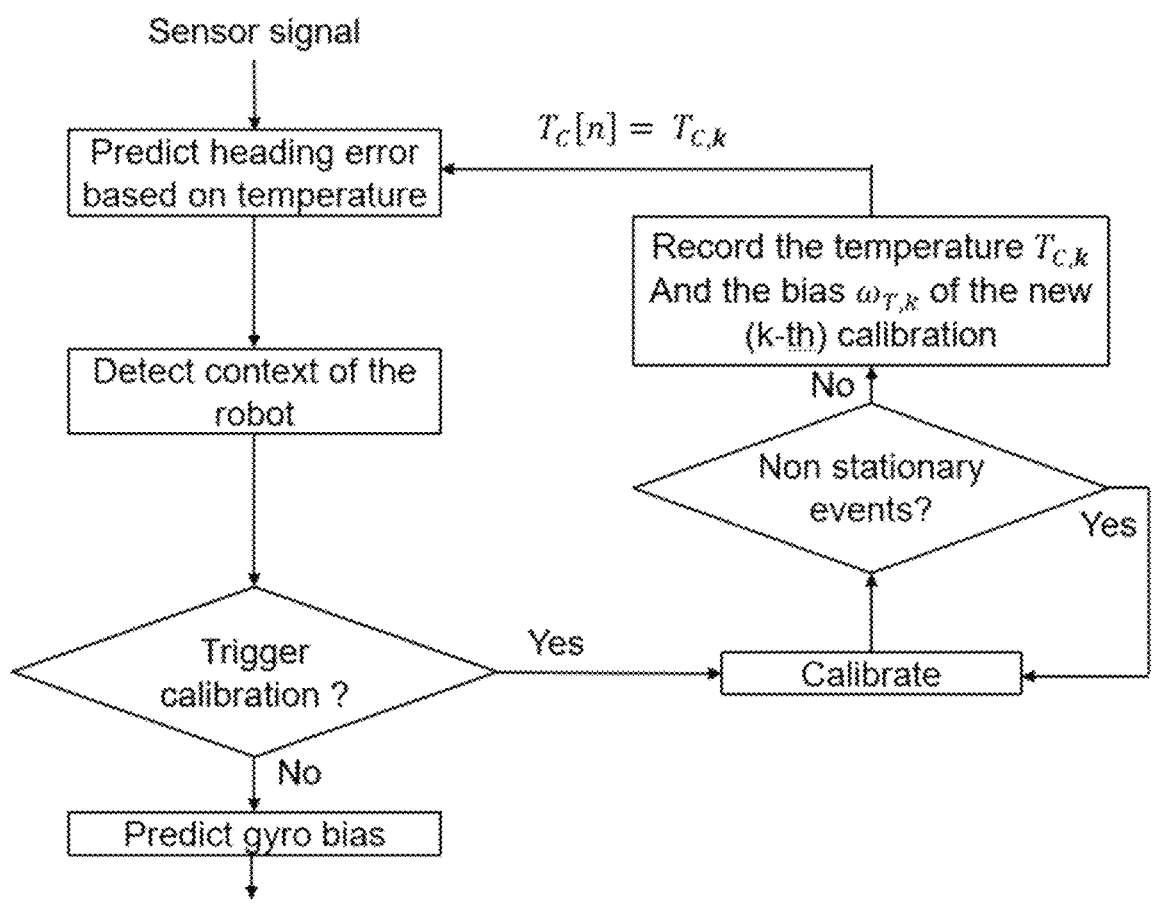
FIG. 17 is a schematic depiction of an exemplary routine for controlling calibration of a mobile robotic device according to an embodiment.

The above techniques may be applied in a coordinated fashion to facilitate calibration at opportune moments and achieve corresponding gains in performance and accuracy. One exemplary routine is schematically depicted in FIG. 17. The routine begins with the input of the signal for the sensor to be calibrated. In this embodiment, the bias is calibrated for a gyroscope, but the techniques of this disclosure can be readily applied to other calibration parameters and other sensors as desired. The first operation is to estimate the accumulated heading error as a function of temperature as described above. Next, if desired, the context of the device is determined, which can include operational state as well as whether external influences exist, such as a lift, tilt or impact event. Then, the routine assesses whether sufficient triggers have occurred so that a request for calibration is warranted. These triggers can include any of those described above, such as absolute change in temperature, interval from last calibration, operational state of the device and others. If not, the gyroscope bias for the current temperature can be predicted using the model built from historical records as described above as an optional step. If sufficient trigger conditions exist, including whether the estimated accumulated heading error exceeds the threshold, whether the absolute temperature change exceeds a threshold, whether an appropriate calibration interval has elapsed, whether the host application has requested calibration, whether the sensor signals indicate a degradation in performance, whether the device is in a non-moving state and others as discussed above, then control module 122 performs the calibration routine. During calibration, control module 122 may also monitor for non-stationary events, such as may result from varying contexts of the device as well as the statistical identification of outliers. If non-stationary events are detected, the routine can return to the calibration operation, otherwise the current temperature during calibration, $T_{C,k}$, and the calculated bias $\omega_{T,k}$, are recorded. As noted above, the predictive model for bias (or other calibration parameter) can then be updated using the new information in embodiments that implement such models. Finally, the value of $T_C[n]$, corresponding to the most recent calibration temperature is set to the current calibration temperature, $T_{C,k}$, and the routine loops to the estimation of accumulated heading error operation and iterates.

Figure 18:
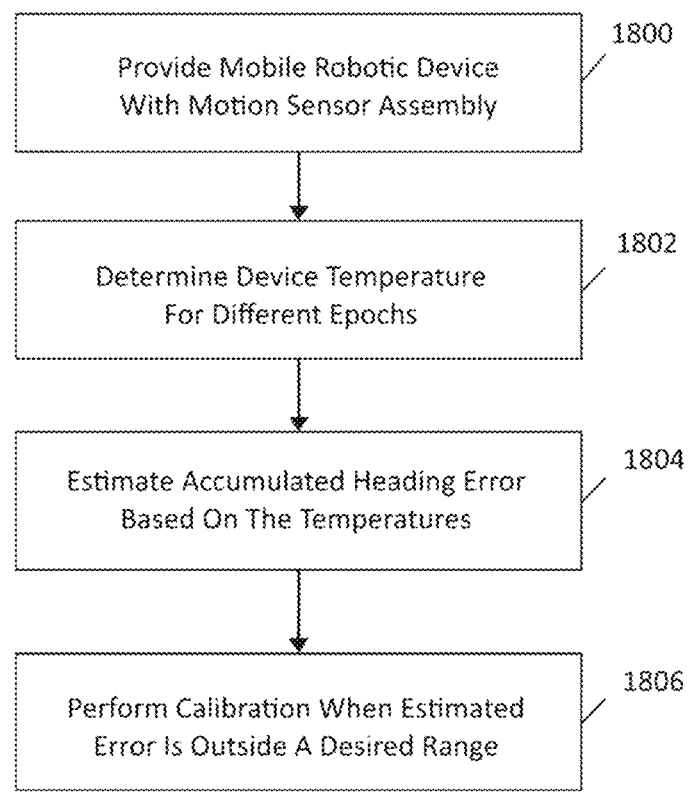
FIG. 18 is a schematic depiction of an exemplary routine for triggering calibration of a mobile robotic device based on estimated accumulated heading error according to an embodiment.

From the above, it will be appreciated that the techniques of this disclosure include a method for controlling a mobile robotic device as schematically indicated in FIG. 18. In particular, the method includes step 1800 of providing a mobile robotic device having a motion sensor assembly configured to provide data for deriving a navigation solution for the mobile robotic device. In 1802, the mobile robotic device temperature for at least two different epochs may be determined so that an accumulated heading error of the navigation solution based on the determined temperatures can be estimated in 1804. A calibration procedure is performed for at least one sensor of the motion sensor assembly in 1806 when the estimated accumulated heading error is outside a desired range.

In one aspect, estimating the accumulated heading error may be an integration of a difference between a current temperature and a preceding calibration temperature.

In one aspect, a motion state of the mobile robotic device may be requested prior to performing the calibration procedure. The motion sensor assembly may be used to monitor the motion state of the mobile robotic device so that the calibration procedure is performed once the requested motion state is obtained. The motion state may be the cessation of motion the mobile robotic device. The motion state may be a device state of the mobile robotic device.

In one aspect, the calibration procedure may be configured to mitigate vibrational effects. The vibrational effects may be mitigated by statistically excluding outlying bias estimations.

In one aspect, an initial calibration procedure may be performed when the mobile robotic device is not in mechanical operation.

In one aspect, a current calibration state may be assessed so that the calibration procedure may be adjusted based at least in part on the assessment.

In one aspect, a compensation for estimated heading error may be iteratively applied to subsequent calibration intervals.

In one aspect, bias estimations may be stored for at least one sensor of the motion sensor assembly at known temperatures. A model relating the stored bias estimations to temperature may be built. A temperature of the mobile robotic device may be determined so that the model may be used to predict and apply a bias. New bias estimations may be stored so that a subsequently predicted bias is further based at least in part on the stored new bias estimations. A calibration procedure may be initiated when no bias estimation is stored for a current operating temperature.

In one aspect, a context of the mobile robotic device may be detected based at least in part on sensor data from the motion sensor assembly so that a calibration procedure is modified based at least in part on the detected context. Modifying a calibration procedure may include initiating the calibration procedure when the detected context is an impact, delaying the calibration procedure when the detected context is a tilt, delaying the calibration procedure when the detected context is a lift and/or others.

In one aspect, a calibration procedure may be performed after a predetermined time has elapsed since a previous calibration.

In one aspect, a calibration procedure may be performed when a difference between a current temperature and a preceding calibration temperature exceeds a threshold.

Further, this disclosure includes a mobile robotic device having a motion sensor assembly configured to provide data for deriving navigation solutions for the mobile robotic device and a controller having at least one processor configured to estimate an accumulated heading error as a function of temperature and perform a calibration procedure for at least one sensor of the motion sensor assembly when the estimated accumulated heading error is outside a desired range.

In one aspect, the at least one processor may be configured to request a motion state of the mobile robotic device prior to performing the calibration procedure. The mobile robotic device may be configured to performing a cleaning operation and the motion state may be a state of the cleaning operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for controlling a mobile robotic device comprising:
providing a mobile robotic device having a motion sensor assembly configured to provide data for deriving a navigation solution for the mobile robotic device;
determining the mobile robotic device temperature for at least two different epochs;
estimating an accumulated heading error of the navigation solution based on the determined temperature at the at least two different epochs; and
responsive to the estimate of the accumulated heading error being outside of a desired range:
issuing a stop request to the mobile robotic device to cause it to stop moving; and
performing a calibration procedure for at least one sensor of the motion sensor assembly after the mobile robotic device has stopped moving in response to the stop request.

2. The method of claim 1, wherein estimating the accumulated heading error comprises an integration of a difference between a current temperature and a preceding calibration temperature.

3. The method of claim 1, wherein the motion state comprises cessation of motion the mobile robotic device.

4. The method of claim 1, wherein the motion state comprises a device state of the mobile robotic device.

5. The method of claim 4, further comprising performing an initial calibration procedure when the mobile robotic device is not in mechanical operation.

6. The method of claim 1, wherein the calibration procedure is configured to mitigate vibrational effects.

7. The method of claim 6, wherein the vibrational effects are mitigated by statistically excluding outlying bias estimations.

8. The method of claim 1, further comprising assessing a current calibration state and adjusting the calibration procedure based at least in part on the assessment.

9. The method of claim 1, further comprising iteratively applying a compensation for estimated heading error to subsequent calibration intervals.

10. The method of claim 1, further comprising storing bias estimations for at least one sensor of the motion sensor assembly at known temperatures.

11. The method of claim 10, further comprising building a model relating the stored bias estimations to temperature.

12. The method of claim 11, determining a temperature of the mobile robotic device, using the model to predict a bias and applying the predicted bias.

13. The method of claim 12, further comprising storing new bias estimations so that a subsequently predicted bias is further based at least in part on the stored new bias estimations.

14. The method of claim 10, further comprising initiating a calibration procedure when no bias estimation is stored for a current operating temperature.

15. The method of claim 1, further comprising detecting a context of the mobile robotic device based at least in part on sensor data from the motion sensor assembly and modifying a calibration procedure based at least in part on the detected context.

16. The method of claim 15, wherein modifying a calibration procedure comprises initiating the calibration procedure when the detected context is at least one of an impact, a directional bump, a tilt and a lift.

17. The method of claim 1, further comprising performing a calibration procedure after a predetermined time has elapsed since a previous calibration.

18. The method of claim 1, further comprising performing a calibration procedure when a difference between a current temperature and a preceding calibration temperature exceeds a threshold.

19. The method as recited in claim 1, further comprising: clearing the stop request after performance of the calibration procedure so that the mobile robotic device may resume operation.

20. A mobile robotic device comprising:
a motion sensor assembly configured to provide data for deriving navigation solutions for the mobile robotic device; and
a controller having at least one processor configured to:
estimate an accumulated heading error as a function of temperature; and
responsive to the estimate of the accumulated heading error being outside of a desired range:
issue a stop request to the mobile robotic device to cause it to stop moving; and
perform a calibration procedure for at least one sensor of the motion sensor assembly after the mobile robotic device has stopped moving in response to the stop request.

21. The mobile robotic device of claim 20, wherein the mobile robotic device is configured to perform a cleaning operation, and wherein the motion state comprises a state of the cleaning operation.

22. The mobile robotic device of claim 20, wherein the controller is further configured to:
clear the stop request after performance of the calibration procedure so that the mobile robotic device may resume operation.

* * * * *